(12) United States Patent
Jung

(10) Patent No.: US 11,209,841 B2
(45) Date of Patent: Dec. 28, 2021

(54) PRESSURE REGULATOR FOR FUEL CELL SYSTEM

(71) Applicants: HYUNDAI MOTOR COMPANY, Seoul (KR); KIA MOTORS CORPORATION, Seoul (KR)

(72) Inventor: Se Kwon Jung, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/095,044

(22) Filed: Nov. 11, 2020

(65) Prior Publication Data

US 2021/0072774 A1 Mar. 11, 2021

Related U.S. Application Data

(62) Division of application No. 16/210,114, filed on Dec. 5, 2018, now Pat. No. 10,852,753.

(30) Foreign Application Priority Data

Sep. 18, 2018 (KR) ........................ 10-2018-0111183

(51) Int. Cl.
*G05D 16/10* (2006.01)
*F16K 31/122* (2006.01)
*H01M 8/04089* (2016.01)

(52) U.S. Cl.
CPC ....... *G05D 16/106* (2013.01); *F16K 31/1221* (2013.01); *G05D 16/103* (2013.01); *H01M 8/04104* (2013.01); *Y10T 137/7808* (2015.04)

(58) Field of Classification Search
CPC ......... Y10T 137/7808; Y10T 137/7811; Y10T 137/7822; G05D 16/103; G05D 16/106; F16K 31/1221; H01M 8/04104
(Continued)

(56) References Cited

U.S. PATENT DOCUMENTS 399,548 A * 3/1889 Nageldinger ...... G05D 16/0608
137/505.25
614,441 A * 11/1898 Burnett ................ G05D 16/103
137/505.25
(Continued)

FOREIGN PATENT DOCUMENTS

KR 10-2010-0087488 A ‡ 8/2010
KR 10-2015-0000036 A ‡ 1/2015
(Continued)

*Primary Examiner* — William M McCalister
(74) *Attorney, Agent, or Firm* — Lempia Summerfield Katz LLC

(57) ABSTRACT

A pressure regulator for a fuel cell system may include: a housing having an inlet port into which gas is introduced, an outlet port through which gas is discharged, and an regulated pressure chamber connected to an outside through the outlet port; a piston moving up and down in the housing, having a main flow path penetrating through an inside of the housing and a pressure acting portion applying a pressure of gas in the regulated pressure chamber of the housing, and selectively communicating between the inlet port and the regulated pressure chamber of the housing through the main flow path as the piston moves up and down; and a spring provided in the housing to elastically support the pressure acting portion of the piston on an opposite side of the regulated pressure chamber.

2 Claims, 5 Drawing Sheets

(58) Field of Classification Search
USPC .................... 137/505.25, 505.28, 505.38
See application file for complete search history.

(56) References Cited

U.S. PATENT DOCUMENTS

| | | | | |
|---|---|---|---|---|
| 2,600,137 | A ‡ | 6/1952 | Teague, Jr. | G05D 16/106 137/505.25 |
| 2,675,649 | A ‡ | 4/1954 | Trevaskis et al. | G05D 16/10 137/505.25 |
| 2,888,949 | A * | 6/1959 | Evans | A62B 9/022 137/505.25 |
| 3,283,504 | A ‡ | 11/1966 | Stelzer | B60T 8/26 303/9.73 |
| 3,360,004 | A ‡ | 12/1967 | Lewis | B60T 11/34 137/493 |
| 3,435,843 | A ‡ | 4/1969 | Spencer | G05D 16/103 137/505.25 |
| 3,495,607 | A ‡ | 2/1970 | Shugarman | B63C 11/2209 137/81.2 |
| 3,559,677 | A ‡ | 2/1971 | Barosko | B66F 3/247 137/505.13 |
| 3,890,999 | A ‡ | 6/1975 | Moskow | G05D 16/103 137/505.25 |
| 4,349,136 | A ‡ | 9/1982 | Fallon | G05D 16/0658 222/396 |
| 4,484,695 | A ‡ | 11/1984 | Fallon | G05D 16/0658 222/23 |
| 4,498,471 | A ‡ | 2/1985 | Kranz | A62B 9/022 128/202.22 |
| 4,887,638 | A ‡ | 12/1989 | Hellquist | A62B 9/02 137/505.13 |
| 5,139,046 | A ‡ | 8/1992 | Galli | G05D 16/107 137/505.42 |
| 5,381,825 | A ‡ | 1/1995 | Garraffa | B63C 11/2209 137/505.18 |
| 5,396,918 | A * | 3/1995 | Parker | G05D 16/0608 137/14 |
| 6,047,727 | A ‡ | 4/2000 | Hatori | F16K 1/305 137/505.25 |
| 6,056,006 | A ‡ | 5/2000 | Hagerty | G05D 16/103 137/269 |
| 6,186,168 | B1 ‡ | 2/2001 | Schultz | G05D 16/109 137/505.11 |
| 6,634,378 | B2 ‡ | 10/2003 | Semeia | B63C 11/2209 137/505.25 |
| 6,851,447 | B1 ‡ | 2/2005 | Carroll | G05D 16/103 137/505.25 |
| 7,048,001 | B2 ‡ | 5/2006 | Youngberg | G05D 16/0608 137/505.25 |
| 7,121,298 | B2 ‡ | 10/2006 | Jovic | A62B 9/02 137/505.38 |
| 7,159,611 | B2 ‡ | 1/2007 | Larsen | G05D 16/106 137/50 |
| 7,712,482 | B2 ‡ | 5/2010 | Nomichi | F16K 31/1221 137/505.18 |
| 7,798,169 | B2 ‡ | 9/2010 | Tai | F16K 1/307 137/505.28 |
| 7,828,009 | B2 ‡ | 11/2010 | Neumann | G05D 16/106 137/50 |
| 9,074,703 | B2 ‡ | 7/2015 | Pechtold | F16K 17/30 |
| 2003/0075219 | A1 ‡ | 4/2003 | Carroll | G05D 16/103 137/505.25 |
| 2003/0221726 | A1 ‡ | 12/2003 | Semeia | B63C 11/2209 137/338 |
| 2004/0007269 | A1 ‡ | 1/2004 | Larsen | G05D 16/106 137/50 |
| 2005/0103383 | A1 ‡ | 5/2005 | Carroll | G06Q 10/109 137/505.28 |
| 2006/0254652 | A1 ‡ | 11/2006 | Davidson | G05D 16/103 137/505.25 |
| 2009/0071550 | A1 ‡ | 3/2009 | Patterson | G05D 16/103 137/523 |
| 2009/0078321 | A1 ‡ | 3/2009 | Arnott | G05D 16/103 137/14 |
| 2010/0101666 | A1 ‡ | 4/2010 | Pechtold | G05D 16/04 137/505 |
| 2012/0080101 | A1 ‡ | 4/2012 | Tatarek | B44C 1/227 137/34 |
| 2015/0293539 | A1 ‡ | 10/2015 | Greenwood | G05D 16/0636 137/505.25 |
| 2017/0261010 | A1 * | 9/2017 | Cucciniello | F15B 13/0417 |
| 2017/0285667 | A1 ‡ | 10/2017 | Kobayashi | G05D 16/106 |

FOREIGN PATENT DOCUMENTS

KR   10-20150000036 A     1/2015
KR     10-1808712 B1 ‡  12/2017

\* cited by examiner
‡ imported from a related application

PRESSURE REGULATOR FOR FUEL CELL SYSTEM

CROSS-REFERENCES TO RELATED APPLICATIONS

This application is a divisional of non-provisional U.S. patent application Ser. No. 16/210,114, filed on Dec. 5, 2018, which claims priority to and the benefit of Korean Patent Application No. 10-2018-0111183, filed on Sep. 18, 2018, the entire contents of which are incorporated herein by reference.

FIELD

The present disclosure relates to a pressure regulator for a fuel cell system, and more particularly, to a pressure regulator for a fuel cell system that regulates a pressure of high-pressure hydrogen.

BACKGROUND

The statements in this section merely provide background information related to the present disclosure and may not constitute prior art.

Fuel cells are a kind of power generators that convert chemical energy of a fuel into electric energy by electro-chemically reacting a fuel gas with an oxidant gas and are widely used as power supplies for industry, household and automobile, and can also be used for supplying electric power to small electric/electronic appliances and portable devices.

A polymer electrolyte membrane fuel cell (PEMFC) having a high power density has been mainly used as a fuel cell for a vehicle, and has been used as a power source (electric power source) which supplies power to a motor driving a vehicle and various kinds of electric devices.

Such a polymer electrolyte membrane fuel cell uses hydrogen as a fuel gas and oxygen or oxygen contained in air as an oxidant gas.

The fuel cell includes a unit cell that generates electric energy by reacting the fuel gas with the oxidant gas, and has been typically used in a stack form in which a plurality of unit cells are stacked and assembled by being connected to each other in series to meet an output demand level.

As even the fuel cell for the automobile requires a high power, hundreds of unit cells which individually generate electric energy are stacked in the stack form to meet the requirements.

On the other hand, a fuel cell system for generating electric energy using a fuel cell in a vehicle includes a fuel cell stack in which unit cells are stacked, a fuel supply system for supplying hydrogen as a fuel gas to the fuel cell stack, an air supply system for supplying air as the oxidant gas desired for the electrochemical reaction to the fuel cell stack, and a cooling system for discharging a reaction heat of the fuel cell stack to an outside of the system to control an operating temperature of the fuel cell stack.

The typical fuel cell system for a vehicle adopts a method of compressing hydrogen at a high pressure and storing the compressed hydrogen in a pressure vessel for storing hydrogen, and therefore the fuel supply system includes the pressure vessel capable of storing hydrogen at a high pressure.

In addition, in order to increase the hydrogen storage capacity, there is a trend of continuously increasing the pressure of the hydrogen stored in the pressure vessel, that is, the hydrogen tank. At present, a high-pressure hydrogen tank capable of charging hydrogen up to 875 bar with a maximum allowance working pressure (MAWP) has been generally applied.

Therefore, the pressure regulator is provided to lower the pressure of the hydrogen and supply the pressure to the fuel cell stack. Here, the pressure regulator is a component which regulates the pressure of the hydrogen stored in the high-pressure hydrogen tank in the fuel supply system at a certain pressure level (about 5 to 20 barg) for the fuel cell system.

With the recent mass production of fuel cell vehicles, the amount of hydrogen used is increasing as the vehicle output is required to be increased. Accordingly, there is an increasing demand for a pressure regulator which can stably supply high flow hydrogen and has excellent durability and long life.

If a malfunction such as an internal leak occurs in the pressure regulator, the high-pressure hydrogen exceeding a proper level may be applied to the fuel cell system, resulting in system damage and starting off of vehicle. Also, since a relief valve operates to discharge hydrogen to the outside, there is a risk of safety accidents, and as a result a high-voltage regulator for a vehicle which is more excellent in safety and durability is desired.

Prior art documents related to a high-voltage regulator for a fuel cell system may include U.S. Pat. No. 7,828,009 (Nov. 9, 2010) and Korean Patent No. 10-1808712 (Dec. 7, 2017).

Among them, the regulator disclosed in U.S. Pat. No. 7,828,009 has a disadvantage in that it not only has the complicated configuration and structure, but also has high cost and poor operational stability and durability because many parts need to be precisely machined.

In particular, we have discovered that the regulator has a structure in which a piston reciprocates between a housing and an outlet port, or has trouble in maintaining the same axle because the housing and the outlet port are coupled to each other by a thread to thereby causing poor operational stability.

In addition, since an area of an inlet portion to which a high pressure is applied is relatively larger than that of a portion of the piston to which a pressure is applied, a variation width of a discharge pressure (outlet pressure) is increased according to an inlet pressure of the regulator, and since a sliding airtight structure is applied between a high-pressure portion and an regulated pressure chamber, the durability of the regulator is reduced when the regulator is operated for a long period of time (internal leakage occurs due to abrasion of a sliding airtight portion).

In the case of the high-pressure regulator disclosed in Korean Patent No. 10-1808712, a balance hole is applied so that the inlet pressure of the regulator does not affect the discharge pressure, but we have discovered that the sliding airtight structure needs to be applied to the balance hole portion, such that the durability of the regulator is reduced when the regulator is operated for a long period of time (internal leakage occurs due to abrasion of a sliding airtight portion).

In addition, we have discovered that since the regulator has a structure in which a shaft passes through an internal flow path (orifice), there is a need to increase a size of the orifice to secure a cross-sectional area of the flow path, such that the regulator is affected by the inlet pressure when the balance hole is not applied.

The above information disclosed in this Background section is only for enhancement of understanding of the background of the present disclosure and therefore it may contain information that does not form the prior art that is already known to a person of ordinary skill in the art.

SUMMARY

The present disclosure provides a pressure regulator for a fuel cell system which can be less affected by an outlet pressure according to an inlet pressure, have a simple configuration and structure and excellent durability and operational stability, and stably supply high flow hydrogen.

In one aspect, the present disclosure provides a pressure regulator for a fuel cell system including: a housing having an inlet port into which gas is introduced, an outlet port through which gas whose pressure is controlled is discharged, and an regulated pressure chamber connected to an outside through the outlet port; a piston moving up and down in the housing, having a main flow path penetrating through an inside of the housing, and a pressure acting portion applying a pressure of gas in the regulated pressure chamber of the housing, and selectively communicating between the inlet port and the regulated pressure chamber of the housing through the main flow path as the piston moves up and down; and a spring provided in the housing to elastically support the pressure acting portion of the piston on an opposite side of the regulated pressure chamber.

As a result, the pressure regulator for a fuel cell system according to the present disclosure can be less affected by the outlet pressure according to the inlet pressure, can have the simple configuration and structure and the excellent durability and operational stability, and can stably supply the high flow hydrogen.

That is, it is possible to maximize the area of the pressure acting portion applying the differential pressure between the medium pressure and the atmospheric pressure with respect to the high pressure applying area in the gas flow path to minimize or reduce the influence of the discharge pressure (outlet pressure) due to the inlet pressure without the balance hole, thereby improving the precision of the discharge pressure regulated by the pressure regulator.

In addition, there is no high-pressure sliding airtight portion, such that there is no possibility of the hydrogen leakage even when the regulator is operated for a long period of time, and the rotation of the piston can be prevented by the pillars, such that the gas leakage due to the matching failure between the closed portion of the piston and the orifice hole of the seat can be minimized or reduced.

Further, since the pressure regulator according to the present disclosure can easily manufacture and assemble components to shorten the manufacturing time, and can be mass-produced at a low cost.

In particular, it is possible to reduce the entire height and size of the pressure regulator and reduce the height and size of the housing and the piston which are the largest factors to increase the cost of the pressure regulator by changing the installation position of the spring from the inside of the housing to the outside of the housing, and in particular, by positioning the spring and the support member supporting the spring in the dead volume outside the housing.

In addition, since the spring is provided outside the housing, the volume inside the housing is reduced as compared with the prior art, such that the portions to be machined can be reduced at the time of manufacturing the housing, and the outer part of the housing can be simply molded by the methods such as casting and forging, thereby reducing cost.

In addition, since the spring, the spring seat, the support member, and the like are provided outside the housing and exposed to the outside before the cover is assembled, the installation and assembly operations of these components can be easily performed, thereby increasing the productivity.

In addition, it is possible to appropriately regulate the force of the spring to the desired level only by rotating the support member.

The above and other features of the present disclosure are discussed infra.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
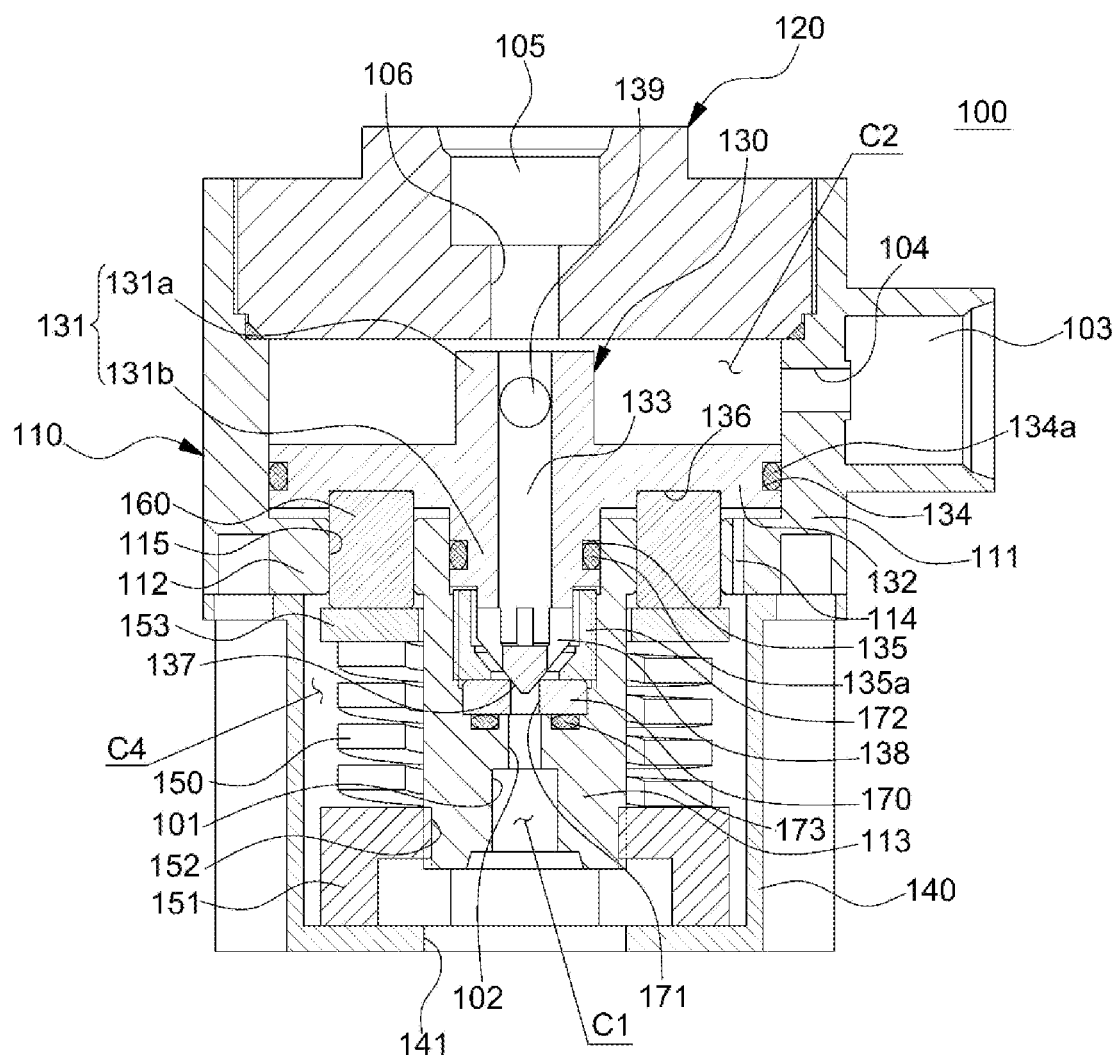
FIGS. 1 and 2 are cross-sectional views showing an internal configuration of a pressure regulator according to one form of the present disclosure, and are diagrams showing operation states separately.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particular intended application and use environment.

While the present disclosure will be described in conjunction with exemplary forms, it will be understood that present description is not intended to limit the present disclosure to those exemplary forms. On the contrary, the present disclosure is intended to cover not only the exemplary forms, but also various alternatives, modifications, equivalents and other forms, which may be included within the spirit and scope of the present disclosure as defined by the appended claims.

Hereinafter, exemplary forms of the present disclosure so as to be easily practiced by a person skilled in the art to which the present disclosure pertains will be described in detail with reference to the accompanying drawings. However, the present disclosure is not limited to exemplary forms herein, but may be implemented in other forms.

Throughout the present specification, unless explicitly described to the contrary, "comprising" any components will be understood to imply the inclusion of other elements rather than the exclusion of any other elements.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The present disclosure relates to a pressure regulator for regulating a pressure of hydrogen in a fuel cell system and supplying the regulated pressure to a fuel cell stack.

In particular, the present disclosure relates to a pressure regulator for a fuel cell system which can be less affected by an outlet pressure according to an inlet pressure, can have a simple configuration and structure and excellent durability and operational stability, and can stably supply high flow hydrogen.

In addition, the pressure regulator of the present disclosure regulates the pressure of hydrogen supplied from a hydrogen tank in the fuel supply system and can be used as a high-pressure regulator for regulating a pressure of high-pressure hydrogen as a fuel gas to a pressure usable in a fuel cell system.

Hereinafter, a configuration of the pressure regulator according to an form of the present disclosure will be described in detail with reference to the drawings.

Figure 2:
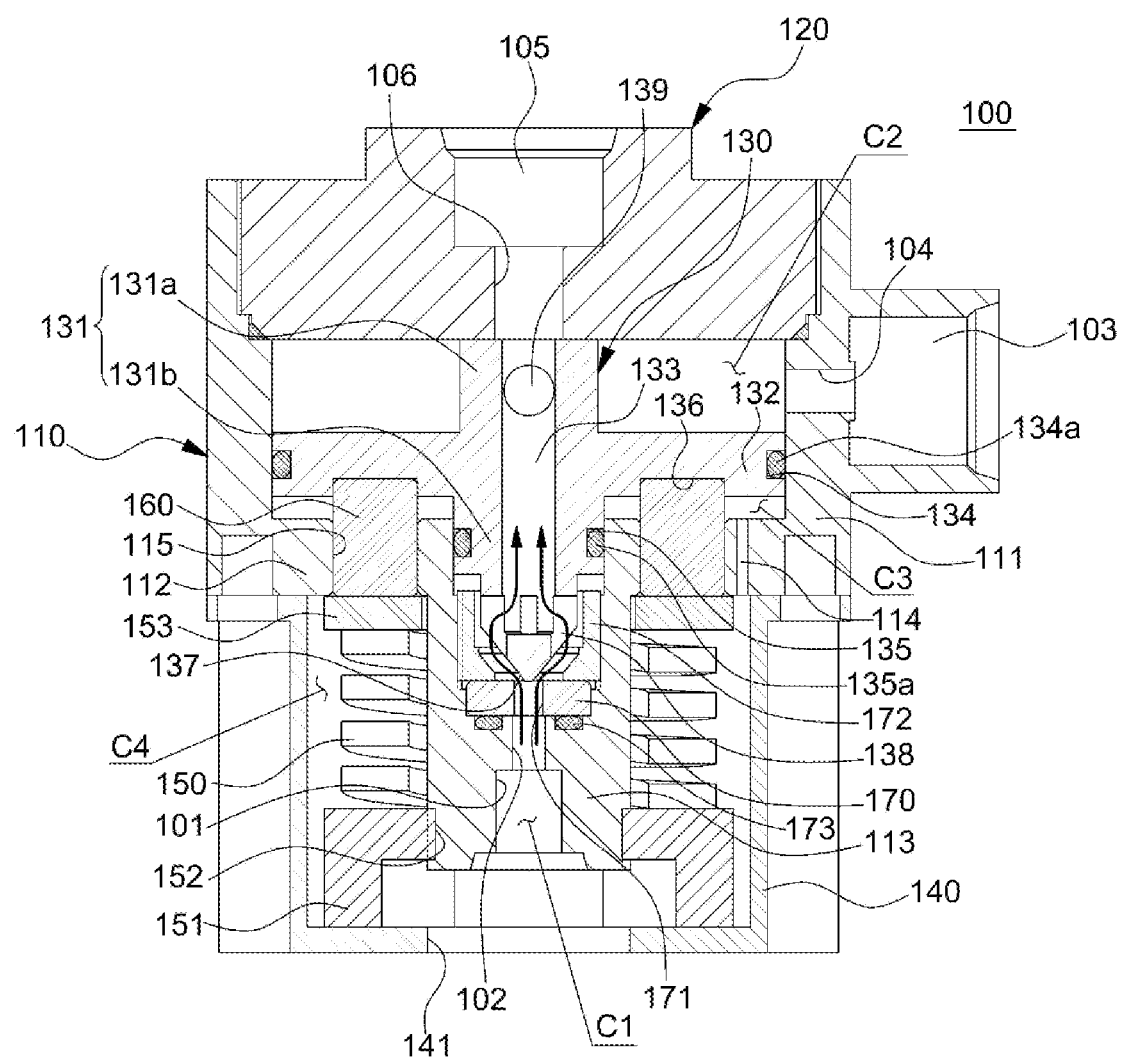

FIGS. 1 and 2 are cross-sectional views showing an internal configuration of the pressure regulator in one form of the present disclosure, and are diagrams showing operation states separately, in which FIG. 1 shows a closed state and FIG. 2 is an open state.

Figure 3:
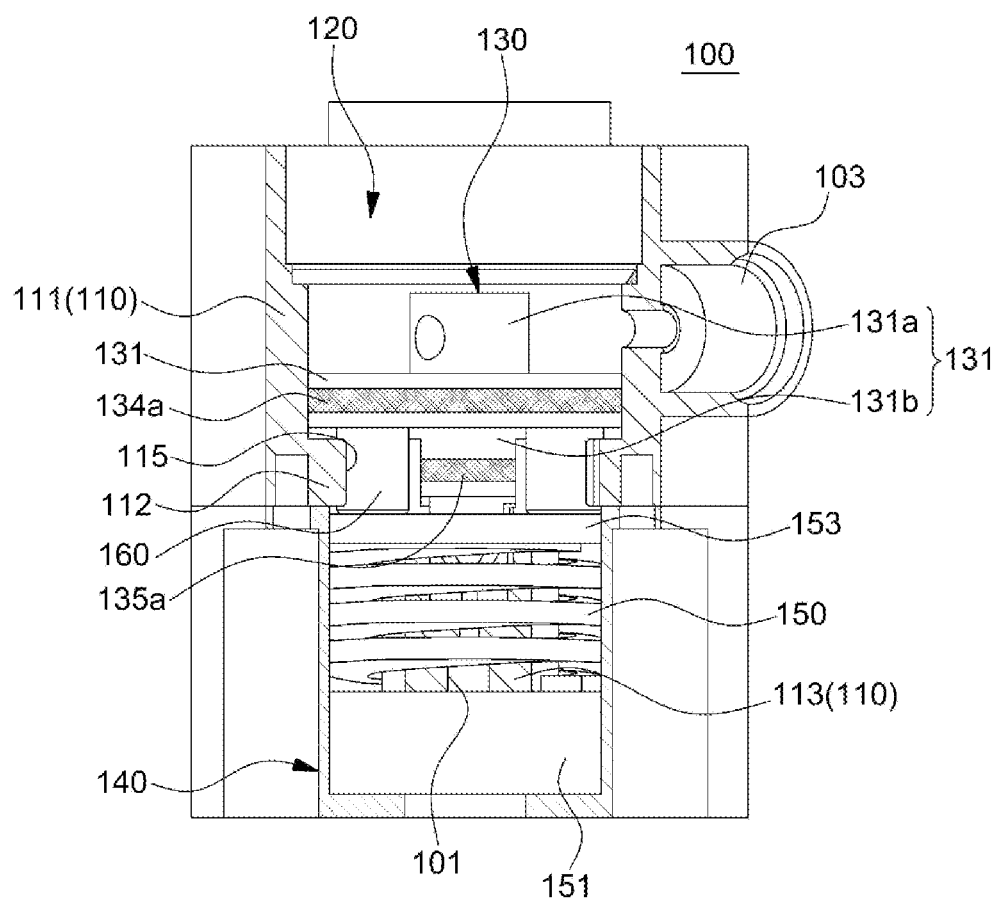
FIG. 3 is a cut perspective view of some components in the pressure regulator in one form of the present disclosure.
Figure 4:
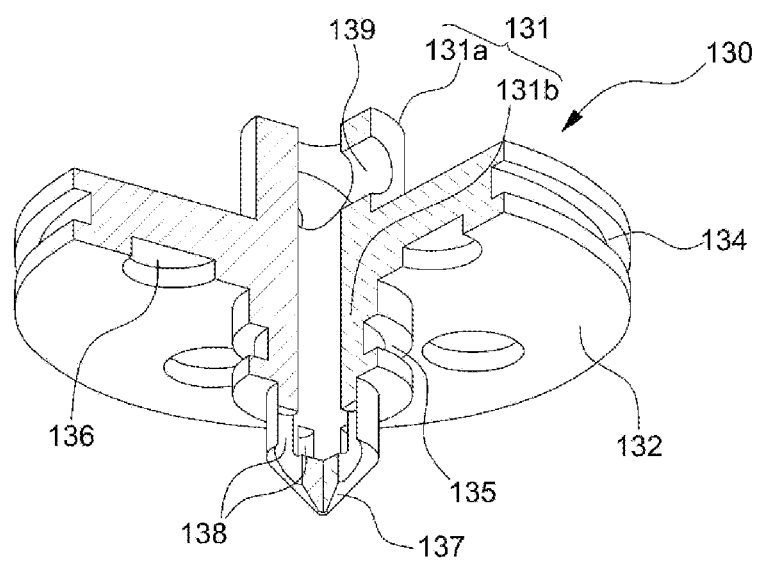
FIG. 4 is a cut perspective view of a piston in the pressure regulator in one form of the present disclosure.

In addition, FIG. 3 is a cut perspective view of some components in the pressure regulator in one form of the present disclosure, and FIG. 4 is a cut perspective view of a piston in the pressure regulator in one form of the present disclosure.

First, a pressure regulator 100 according to one exemplary form of the present disclosure includes: a hollow housing 110 having an internal space and including an inlet port 101 into which gas is introduced, and outlet ports 103 and 105 through which gas whose pressure is controlled is discharged; and an regulated pressure chamber C2 connected to the outside through the outlet ports 103 and 105. The pressure regulator 100 further includes a piston 130 that moves up and down in the housing, and a spring provided in the housing.

In more detail, the piston 130 is inserted to be moveable up and down in the inner space of the housing 110.

Here, the piston 130 includes a pressure acting portion 132 applying a gas pressure in an regulated pressure chamber C2 of the housing 110 as will be described later, and selectively communicate between the inlet port 101 and the intermediate pressure chamber C2 of the housing 110 through a main flow path 183 penetrating through the housing 110 as the piston 130 moves up and down in the housing 110.

In addition, the inlet port 101 into which gas, that is, hydrogen as fuel is introduced is formed on one side of the housing 110, for example, on a lower end of the housing 110, and a main flow path, and a main flow path 103 of the piston 130 and a first output port 103 having a horizontal outlet path through which the gas passing through the inner space of the housing 110 is discharged in a horizontal direction is provided at the other side of the housing 110.

At this time, the first outlet port 103 may include a hole 104 penetrating through an upper side of the housing 110 as illustrated.

Although one first outlet port 103 is shown in FIGS. 1 to 3, a plurality of first outlet ports 103 may be provided.

In the pressure regulator 100 in one form of the present disclosure, the piston 130 selectively opens and closes the inlet port 101 of the housing 110 as it moves up and down by the gas pressure.

A cap 120 for sealing an inner space is fixed to an upper end of the housing 110, and the cap 120 may be provided with the second outlet port 105 configured by forming the hole 106 penetrating through the cap 120.

The cap 120 is a component which closes the regulated pressure chamber C2 in the housing 110 and becomes the first outlet port 103 formed in the housing 110, and the second outlet port 105 formed in the cap 120 becomes an output port connecting the regulated pressure chamber C2 to the outside.

In addition, the housing 110 has an upper first cylinder portion 111 having a relatively larger inner diameter and outer diameter and a lower second cylinder portion 111 having an inner diameter and an outer diameter relatively smaller than that of the first cylinder portion 111, and an inner space of the first cylinder portion 111 and an inner space of the second cylinder portion 113 form one inner space in the housing 110 while communicating with each other.

At this time, the inlet port 101 of the housing 110 includes a hole 102 formed to penetrate through a lower end of the second cylinder portion 113 long up and down.

The first outlet port 103 is formed on a side surface of the first cylinder portion 111, and the cap 120 is fixed to an upper end of the first cylinder portion 111.

Since the inner space of the first cylinder portion 111 in the housing 110 has a larger volume than the inner space of the second cylinder portion 113, so that the inner diameter and outer diameter of the first cylinder portion 111 each are relatively larger than the inner diameter and the outer diameter of the cylinder portion 113.

In this structure, the housing 110 may have a shape in which the second cylinder portion 113 protrudes long downward from a center of the bottom part 112 of the first cylinder portion 111 and extends by a predetermined length.

In the pressure regulator 100, the housing 110 may be manufactured by precision dimension processing to be first molded to have a desired shape by methods such as casting and forging and then formed to have a targeted dimension for each part of the housing after the molding.

On the other hand, a cover 140 assembled to enclose the periphery of the second cylinder portion 113 is provided on a bottom part 112 of the first cylinder portion 111, and since the cover 140 has a cylindrical shape having the inner space, the inner space of the cover 140 becomes the second cylinder portion 113 which is the lower part of the housing 110 and a spring chamber C4 in which a spring 150 and a spring seat and a support member 151 are received.

That is, the second cylinder portion 113 is positioned in the spring chamber C4, which is the inner space of the cover 140, the support member 151 is screwed to an outer circumferential surface of the lower end of the second cylinder portion 113, and the support member 151 is also positioned in the inner space of the cover 140.

The cover 140 is provided on the lower part of the housing 110 to protect components such as pillars 160, the spring 150, the spring seat 153, and the support member 151 positioned inside.

The support member 151 is formed in a ring shape, more specifically, a nut shape in which threads 152 are machined on an inner circumferential surface thereof.

A hole 141 is provided on the lower surface of the cover 1401, and the inlet port 101 formed in the second cylinder portion 113 can be connected to the outside of the cover 140 through the hole 141.

In addition, the pressure regulator 100 includes the spring 150 provided in the housing 110 and elastically supporting the pressure acting portion 132 of the piston 130 on an opposite side of the regulated pressure chamber C2, and the pillars 160 coupled to the pressure acting portion 132 of the piston 130 to transmit a force between the spring 150 and the pressure acting portion 132 of the piston 130.

In one form, the pressure regulator 100 may further include the spring seat 153 provided between the spring 150 and the pillars 160.

In this configuration, the spring 150 may be provided outside the housing 110. At this time, the pillars 160 may penetrate through the housing 110 while being elastically supported by the spring 150 to be coupled to the pressure acting portion 132 of the piston 130.

To this end, a plurality of through holes 115 are disposed in the housing 110 at equal intervals along the circumferential direction, and each pillar 160 inserted into each through holes 115 is interposed between the spring seat 153 and the pressure acting portion 132 of the piston 130 in a state in which each pillar 160 is inserted into each of the through holes 115.

Describing in more detail the above-mentioned configuration, the spring 150 is provided in the second cylinder portion 113 of the housing 110 so as to be positioned around the second cylinder portion 113 in the inner space of the cover 140, and the ring-shaped spring seat 153 is provided on the upper side of the spring 150 to be positioned around the second cylinder portion 113.

The spring 150 elastically supports the pressure acting portion 132 of the piston 130 on the opposite side of the regulated pressure chamber C2 while provided on the housing 110 by the support member 151.

At this time, the spring 150 disposed outside the second cylinder 113 is positioned between the lower support member 151 and the upper spring seat 153, the pillars 160 are positioned on the upper side of the spring seat 153 to be inserted into the inner space of the first cylinder portion 111, and the spring 150 elastically support the pillars 160 through the spring seat 153.

The support member 151 is to adjust the force of the spring 150 and may appropriately adjust the force of the spring 150 to the desired level by rotating the support member 151 in any one direction or in the opposite direction.

As described above, the support member 151 is screwed to the housing 110 and the spring 150 is supported by the support member 151, so that the spring 150 may be supported in the housing 110 by the support member 151.

The inner space of the cover 140 is an atmospheric pressure space in which a high pressure is not formed by gas (hydrogen gas as fuel). A communicating flow path 114 penetrates through the lower part of the housing 110 to communicate between the inside and the outside of the housing 110, thereby introducing and discharging air.

In particular, the communicating flow path 114 penetrates through the first cylinder portion 111 and may be formed to communicate between the atmospheric pressure chamber C2 which is a space at the lower part of the pressure acting portion 132 of the piston 130 to be described later and the outer space of the housing 110.

Here, the outer space of the housing 110 communicating with the atmospheric pressure chamber C3 by the communication passage 114 may be the inner space of the cover 140 which is the atmospheric pressure space, that is, the spring chamber C4 as shown in FIGS. 1 and 2.

To this end, the communicating flow path 114 may penetrate through the bottom part 112 of the first cylinder portion 111, so that the communicating flow path 114 connects between the atmospheric pressure chamber C3 in the inner space of the first cylinder portion 111 where the piston 130 is positioned and the inner space of the cover 140 which is a space where the spring 150 and the spring seat 153 are positioned, that is, the outer space of the housing 110.

Although one communication passage 114 is formed in the illustrated example, a plurality of communicating flow paths 114 may be provided on the bottom part 112 of the first cylinder as desired. In the present disclosure, the number of communicating flow paths 114 is not particularly limited.

In one form, as illustrated in FIGS. 1 to 3, the spring 150 and the spring seat 153 are disposed around the outer space of the housing 110, particularly, around the outside of the second cylinder portion 113 of the housing 110. In this case, the support member 151 supporting the spring 150 is screwed to the outer circumferential surface of the lower end of the second cylinder portion 113 to be assembled, such that the spring 150 and the support member 151 are positioned in the dead volume of the high-pressure flow path portion to reduce the total height and size of the regulator 100 and reduce the heights and sizes of the housing 110 and the piston 130 which are the largest factors to increase the cost of the pressure regulator 100.

In addition, since the spring 150 is provided outside the housing 150, the volume inside the housing is reduced as compared with the prior art, such that the portions to be machined can be reduced at the time of manufacturing the housing, and the outer part of the housing 110 can be simply molded by the methods such as casting and forging, thereby reducing cost.

In this configuration, since the spring 150, the spring seat 153, the support member 151, and the like are all exposed to the outside before the cover 140 is assembled, there is advantage in that the assembly operation is facilitated.

In particular, the pressure regulator 100 according to the present disclosure is simpler in construction than the known pressure regulator 100, so that not only the number of components is reduced but also all the spring 150 and the support member 151 which are components generating a torque are exposed to the outside of the pressure regulator 100, thereby making the assembling process simple and increasing the productivity.

Meanwhile, the pillars 160 are provided to be elastically supported by the spring 150 with the spring seat 153 interposed therebetween. At this time, the pillars 160 are disposed over the inner space and the outer space of the housing 110 by penetrating through the housing 110.

That is, the pillars 160 are provided between the piston 130 positioned in the inner space of the housing 110 by penetrating through the housing 110 and the spring 150 positioned in the outer space of the housing 110 (inner space of the cover), and is a component which receives the force of the spring 150 through the spring seat 153 and transmits and applies the received force to the piston 130.

In the form of the present disclosure, a plurality of pillars 160 may be provided in the housing 110 at predetermined intervals along the circumferential direction. The plurality of pillars 160 may be arranged at a predetermined interval along the circumferential direction.

At this time, the pillars 160 may penetrate through the bottom part 112 of the first cylinder portion 111. For this purpose, the through hole 115 is provided at the installation positions of each pillar on the bottom part 112 of the first cylinder portion 111.

The through holes 115 may be positioned on the bottom part 112 of the first cylinder portion 111 at equal intervals along the circumferential direction with respect to the second cylinder portion 113, and the pillars 160 are interposed between the spring seat 153 and the piston 130 while being inserted into each through hole 115 one by one.

By doing so, the plurality of pillars 160 stably support the piston while being arranged at equal intervals along the circumferential direction, and the force of the spring 150 may be uniformly applied to the whole of the piston 130 along the circumferential direction through the plurality of pillars 160.

According to the form of the present disclosure, when the plurality of pillars 160 penetrates through the bottom part 112 of the first cylinder portion 111, the plurality of pillars 160 are disposed around the second cylinder portion 113.

In addition, the plurality of pillars 160 are supported by being in contact with the lower surface of the pressure acting portion 132 of the piston 130. At this time, a coupling groove 136 is formed at the installation positions of each pillar on the lower surface of the pressure acting portion 132.

The coupling grooves 136 may be formed on the lower surface of the pressure acting portion 132 of the piston 130, for example, at equal intervals along the circumferential direction, and the upper end of each pillar 160 is inserted into and coupled to the inner sides of each coupling groove 136.

As described above, each pillar 160 is inserted into the coupling groove 136 of the piston 130, so that the pillars 160 inhibit or prevent the piston 130 from rotating.

A closed portion 137 of the piston 130 and an orifice hole 171 of the housing 110 side in the pressure regulator 100 maintain air tightness of the closed state by a line contact or a surface contact, and when the piston 130 is rotated in a state where the contact portions on both sides are engaged with each other while being deformed due to the processed ruggedness of the closed portion 137 and the orifice hole 171, the engaged portion may be distorted or deformed, such that micro-leakage may occur.

However, in the exemplary forms of the present disclosure, since the rotation of the piston 130 is inhibited or prevented by the pillars 160 coupled to the coupling groove 136, the possibility of micro-leakage occurring by the above-described reason may be reduced.

The orifice hole 171 may be formed on the seat 170 provided in the second cylinder portion 113 of the housing 110 as described below as a hole connected to the inlet port 101 in the housing 110.

As shown in FIG. 4, the piston 130 includes a shaft portion 131 and the pressure acting portion 132 integrally formed with the shaft portion 131 so as to have a disk shape extending in a radial direction with respect to the shaft portion 131).

More specifically, the shaft portion 131 is integrally formed with a central part of the pressure acting portion 132 of the piston 130, and includes a first shaft portion 131a which is a portion extending long upward with respect to the pressure acting portion 132 and a second shaft portion 131b which is a portion toward an opposite side to the first shaft portion 131a in the pressure acting portion 132, that is, extending long downward.

In addition, the shaft portion 131 is formed long and is disposed long up and down over the inner space of the housing 110, that is, over the inner space of the first cylinder portion 111 and the second cylinder portion 113, and has a hollow structure, such that the hollow portion formed long therein along the axial direction becomes the main flow path 133 of the piston 130.

The pressure acting portion 132 of the piston 130 may be integrally formed to have a disk shape extending in a radial direction in a longitudinal middle portion of the substantially axial portion 131, and is disposed in the inner space of the first cylinder 111 having the relatively larger inner diameter. At this time, the pressure acting portion 132 of the piston 130 is horizontally disposed in the inner space of the first cylinder portion 111.

A circumferential surface of a circumferential edge part in the pressure acting portion 132 becomes a surface that comes into contact with an inner circumferential surface of the housing 110 and a surface which slides along the inner circumferential surface of the housing 110 when the piston 130 moves up and down.

At this time, when the piston 130 moves up and down, the circumferential surface of the pressure acting portion 132 may slide on the inner circumferential surface of the housing 110, but the air tightness may be maintained between the circumferential surface of the pressure acting portion 132 and the circumferential surface of the housing 110 so that the inner space of the housing 110 on the upper side thereof and the inner space of the housing 110 on the lower side thereof become a space separated from each other.

In addition, the pressure acting portion 132 and the first shaft portion 131a on the upper side thereof are positioned in the inner space of the first cylinder portion 111, and in particular, in the inner space of the regulated pressure chamber C2 of the first cylinder portion 111, but the second shaft portion 131b on the lower side of the pressure acting portion 132 is inserted into the inner space of the second cylinder portion 113 except for a part of the pressure acting portion 132 side.

The second shaft portion 131b slides along the inner circumferential surface of the second cylinder portion 113 when the piston 130 moves up and down. At this time, the air tightness is maintained between the outer circumferential surface of the second shaft portion 131b and the inner circumferential surface of the second cylinder portion 113 while the whole surfaces thereof are in close contact with each other.

In this way, the circumferential surface of the pressure acting portion 132 slides while keeping the air tightness with respect to the inner circumferential surface of the first cylinder portion 111 and the outer circumferential surface of the second shaft portion 131b also slides while being in contact with the inner circumferential surface of the second cylinder portion, such that they slide along the inner circumferential surface of the housing 110 on both sides of the pressure acting portion 132 and the second shaft portion 131b.

Accordingly, the piston 130 can stably move up and down without shaking in a state in which the pressure acting portion 132 accurately maintains a horizontal position and the shaft portion 131 accurately maintains a vertical position and long up and down.

In addition, the piston 130 can moved in a state in which the piston 130 is always kept concentric with the housing 110 without being tilted to one side in the housing 110, such that when the piston 130 moves down to close the inlet port 101 of the housing 110, the closed portion 137 which is the lower end of the piston 130 may be accurately seated on the orifice hole 171 of the seat 170 and reliably clog the orifice hole 171 of the seat 170.

That is, it is possible to prevent the seating failure of the seat 170 due to the inclination of the piston 130, and the separate configuration and structure for maintaining the concentricity and the coaxiality are unnecessary, thereby enabling the mass production of the pressure regulator 100 and reducing the cost of the pressure regulator 100.

In addition, the pillars 160 provided so as to penetrate through the first cylinder 111 do not have in the form in which it simply contacts and supports the pressure acting portion 132 of the piston 130 positioned in the first cylinder portion 111, but as described above, the pillars 160 have the coupling form in which it is fitted into each coupling groove 136 formed in the pressure acting portion 132, such that it is possible to reliably prevent the piston 130 from rotating even though the piston 130 moves up and down or is applied with the pressure of the high-pressure gas.

In addition, since each pillar 160 is fitted into the coupling groove 136 of the piston 130, the piston 130 may maintain a more stable and accurate posture without being inclined or pushed at a position concentric with the housing 110 and move up and down.

In one form, a ring groove 134 having a continuous shape along the whole circumferential in the circumference direction is long formed on the circumferential surface of the pressure acting portion 132, and an O-ring 134 for sealing is inserted into the inside of the ring groove 134.

The O-ring 134a is tightly interposed between the circumferential surface of the pressure acting portion 132 and the inner circumferential surface of the first cylinder portion 111 of the housing 110 to maintain the air tightness. Even in the inner space of the first cylinder portion 111, the space on the upper side of the pressure acting portion 132 of the piston 130 and the space on the lower side of the pressure acting portion 132 are completely separated from each other.

As a result, the inner space of the housing (the inner space of the first cylinder portion) on the upper side thereof with respect to the disk-shaped pressure acting portion 132 becomes the regulated pressure chamber C2, and the inner space (the inner space of the first cylinder portion) of the housing 110 on the lower side of the pressure acting portion 132 becomes the atmospheric pressure chamber C3 connected to the outside of the housing 110 (the inner space of the cover) through the communicating flow path 114.

That is, an O-ring 134a provides air tightness between the pressure acting portion 132 of the piston 130 and the inner circumferential surface of the housing 110 (first cylinder portion), such that the regulated pressure chamber C2 and the atmospheric pressure chamber C3 may be completely separated spatially from each other with respect to the pressure acting portion 132 in the inner space of the housing 110.

Similarly, the ring groove 135 having a shape continued along the whole circumference of the circumferential direction is long formed even on the outer circumferential surface of the second shaft portion 131b inserted into the second cylinder portion 113, and the O-ring 135a for sealing is inserted into the ring groove 135.

The O-ring 135a is tightly interposed between the inner side surface of the second cylinder portion 113 and the outer circumferential surface of the second shaft portion 131b so as to maintain the air tightness.

Meanwhile, the inlet port 101 penetrating through long the inside of the housing 110 is formed at the lower end of the housing 110 and more specifically at the lower end of the second cylinder portion 113, and the inlet port 101 is connected to the inner space of the upper second cylinder portion 113 into which the second shaft portion 131b of the piston 130 is inserted through the hole 102.

The ring-shaped seat 170 and the cylindrical sheet guide 172 are fixedly provided in the inner space of the upper second cylinder portion 113 communicating with the inlet port 101, the seat 170 is stacked on the bottom surface of the inner space of the second cylinder portion 113 in the state in which the O-ring 173 is interposed, and the seat guide 172 is stacked thereon.

The sheet 170 is supported by being pressed downward by the sheet guide 172 positioned on the upper side, and the orifice hole 171 penetrates through the center of the sheet 170.

The orifice hole 171 is a hole which is connected to the hole 102 of the inlet port 101 in the housing 110, and serves as a passage through which the inlet port 101 and the inner space of the sheet guide 172 are connected to each other and the inlet portion 101 and the inner space of the second cylinder portion 113 are connected to each other.

The lower end of the piston 130, more specifically, the lower end of the second shaft portion 131b may be formed in a conical shape as shown in FIG. 4. The lower end of the second shaft portion 131b may be inserted into the cylindrical seat guide 172.

The sheet guide 172 has an inner shape in which the lower end of the second shaft portion 131b may be received, and when the lower end of the second shaft portion 131b is a conical shape, the inside of the seat guide 172 may also have the shape in which the cone may be received as shown in FIGS. 1 and 2.

The closed portion 137 selectively opening and closing the orifice hole 171 of the seat 170 is formed at the lower end of the second shaft portion 131b according to the vertical position of the piston 130.

The closed portion 137 may be an end portion of the center of the lower end of the second shaft portion 131b which generally has the conical shape, and the closed portion 137 may also have a conical shape.

The closed portion 137 closes the orifice hole 171 of the seat 170 when the piston 130 moves down, and is separated from the orifice hole 171 of the seat 170 to open the orifice hole 171 when the piston 130 moves up.

In addition, the sub flow path 138 connected from the surface thereof to the main passage 133 in the piston 130 is formed at the lower end of the second shaft portion 131b to penetrate through the inside thereof, and the inlet of the sub flow path 138 may be positioned on the surface around the closed portion 137 at the lower end of the second shaft portion 131b.

According to the forms of the present disclosure, the plurality of sub flow paths 138 may be formed at the lower end of the second shaft portion to penetrate through the inside thereof. At this time, the sub flow paths 138 may each be flow paths individually connected to the main flow path 133 on the surface of the lower end of the second shaft portion 131b.

In addition, the inlets of the sub flow paths 138 may all be positioned on the surface around the closed portion 137 at the lower end of the second shaft portion 131b. At this time, the sub flow path flows 138 and the inlets thereof may be disposed at the lower end of the second shaft portion 131b at a predetermined interval along the circumferential direction.

The main flow path 133 is a path formed so as to penetrate long along the center of the inside of the piston 130, and the sub flow paths 138 branch off from the main flow path 133 to become the branch flow paths connected to the surface of the lower end of the second shaft portion 131b.

As described above, in the configuration in which the lower end of the main flow path 133 is connected to the sub flow paths 138, the outlet of the main flow path 133 which is the upper end may be formed to have the opened structure without being clogged on the end surface of the upper end of the piston 130, that is, the upper end of the first shaft portion 131a.

In addition, a separate outlet hole 139 connected to the main flow path 133 may be provided at the upper end of the piston 130, that is, one side of the first shaft portion 131a positioned on the pressure acting portion 132, and the gas moving upward along the main flow path 133 of the piston 130 is discharged to the inner space of the housing 110 on the upper side of the pressure acting portion 132, that is, the regulated pressure chamber C2 through the outlet hole 139.

As described above, the sub flow paths 138 are connected to the main path 133 which is a hollow flow path in the piston 130, and thus when the piston 130 move up to make the inlet port 101 of the housing 110 be in an open state, the gas path through which gas flows in the inner space of the inlet port 101 to which a high pressure is applied, that is, flows from the high pressure chamber C1 toward the main flow path 138 in the piston 130 through the orifice hole 171 and the sub flow path 138 of the seat 170 and then flows in the regulated pressure chamber C2 through the outlet hole 139 is formed, such that an area to which a high pressure is applied can be minimized or reduced and the effect of the regulated pressure chamber C2 may be maximized or increased.

In the pressure regulator 100 configured as described above, since the high pressure chamber C1 and the regulated pressure chamber C2 are separated by the seat 170 and the piston 130, there is no high-pressure sliding airtight portion other than the contact portion between the piston 130 and the seat 170, that is, the closed portion 137 of the piston 130 and the orifice hole 171 of the seat 170.

In FIGS. 1 and 2, the high pressure chamber C1 and the regulated pressure chamber C2 are indicated by reference numerals C1 and C2, respectively, and the inner space of the housing 110 is separated into the high pressure chamber C1 and the regulated pressure chamber C2 by the piston 130.

In addition, the gas in the pressure regulator 100 flows along the path of the high pressure chamber C1 of the housing 110 the hole 102 of the inlet port 101 the orifice hole 171 of the seat 170 the inner space of the seat guide 172 the sub flow path 138 of the piston 130 and the main passage 133 the regulated pressure chamber C2 the paths of the outlet ports 103 and 105.

By doing so, the configuration of the pressure regulator 100 according to the form of the present disclosure has been described in detail with reference to the drawings. The pressure regulator 100 according to the form of the present disclosure described above has a simpler configuration and a smaller number of components than the well-known pressure regulator for the fuel cell system.

In addition, compared to the known pressure regulator, in the case of the pressure regulator 100 according to one form of the present disclosure, there is no part requiring precision machining other than the coupling portion between the housing 110 and the piston 130 to lower the cost of the components and rapidly produce the components, thereby supplying the pressure regulator with low price and in mass production.

In addition, it is possible to increase the area ratio of the area to which the high pressure is applied and the area that generates the differential pressure between the regulated pressure chamber C2 and the atmospheric pressure chamber C3 by reducing the area of the portion to which the high pressure is applied, thereby reducing the influence of the outlet pressure by the inlet pressure.

Hereinafter, an operation state will be described with reference to FIGS. 1 and 2.

First, when there is no pressure on the inlet and outlet sides of the pressure regulator 100, the spring 150 transmits an upward force to the piston 130 through the spring seat 153 and the pillars 160. At this time, the piston 130 moves up.

As a result, the closed portion 137 of the piston 130 is separated from the seat 170, and the flow path in the pressure regulator 10 is in the open state while the orifice hole 171 of the seat 170 closed by the closed portion 137 is opened.

In addition, when the high-pressure hydrogen pressure is applied to the inlet port 101, the hydrogen gas is introduced into the regulated pressure chamber C2 through the orifice hole 171 of the seat 170 and the sub flow path 138 and the main flow path 133 of the piston 130, such that the pressure in the regulated pressure chamber C2 moves up.

As described above, if the pressure in the regulated pressure chamber C2 moves up, the differential pressure is formed between the regulated pressure chamber C2 and the atmospheric pressure chamber C2, and as the pressure in the regulated pressure chamber C2 moves up, the differential pressure is increased. At this time, the differential pressure acts as a force pressing the pressure acting portion 132 of the piston 130 downward.

If the force acting on the pressure acting portion 132 of the piston 130 by the differential pressure is larger than a sum of the force of the spring 150, that is, the force transmitted by the spring 150 through the pillars 160 to act on the pressure acting portion 132 with the force to allow the pressure of the high pressure gas in the inlet port 101 to push up the shaft portion 131 (portion including the closed portion 137 of the second shaft portion 131b) of the piston 130, the piston 130 moves down to make the closed portion 137 of the second shaft portion 131b contact the seat 170 again. At this time, the closed portion 137 clogs the orifice hole 171 of the seat 170 to close the gas flow path in the pressure regulator 100.

That is, under the condition that '(the pressure of the high-pressure gas in the inlet port×the area of the second shaft portion on which the gas pressure acts+the force of the spring)>(the differential pressure between the regulated pressure chamber and the atmospheric pressure chamber× the area of the piston such as the pressure acting portion on which the differential pressure acts), the piston 130 moves down to allow the closed portion 137 to clog the orifice hole 171, such that the gas flow in the pressure regulator 100 is closed.

In addition, the gas in the regulated pressure chamber C2 is discharged through the outlet ports 103 and 105 and the pressure in the regulated pressure chamber C2 is lowered and the differential pressure between the pressure in the regulated pressure chamber C2 and the atmospheric pressure is reduced, and thus to the contrary above, if the force of the spring 150 and the pressure of the high-pressure gas become smaller than the sum of the forces pushing the shaft portion 130 of the piston 130 up, the piston 130 moves up again to again open the orifice hole 171 of the seat 170 closed by the closed portion 137, such that the gas flow path in the pressure regulator 100 is in the open state, thereby making the gas flow through the pressure regulator 100.

In the process of opening and closing the orifice hole 171 in the pressure regulator 100 is repeated while the piston 130 moves up and down as described above, the pressure in the regulated pressure chamber C2 is kept constant within a specific range, such that the high-pressure gas may be regulated to the regulated pressure in the pressure regulator 100 to be discharged.

Figure 5:
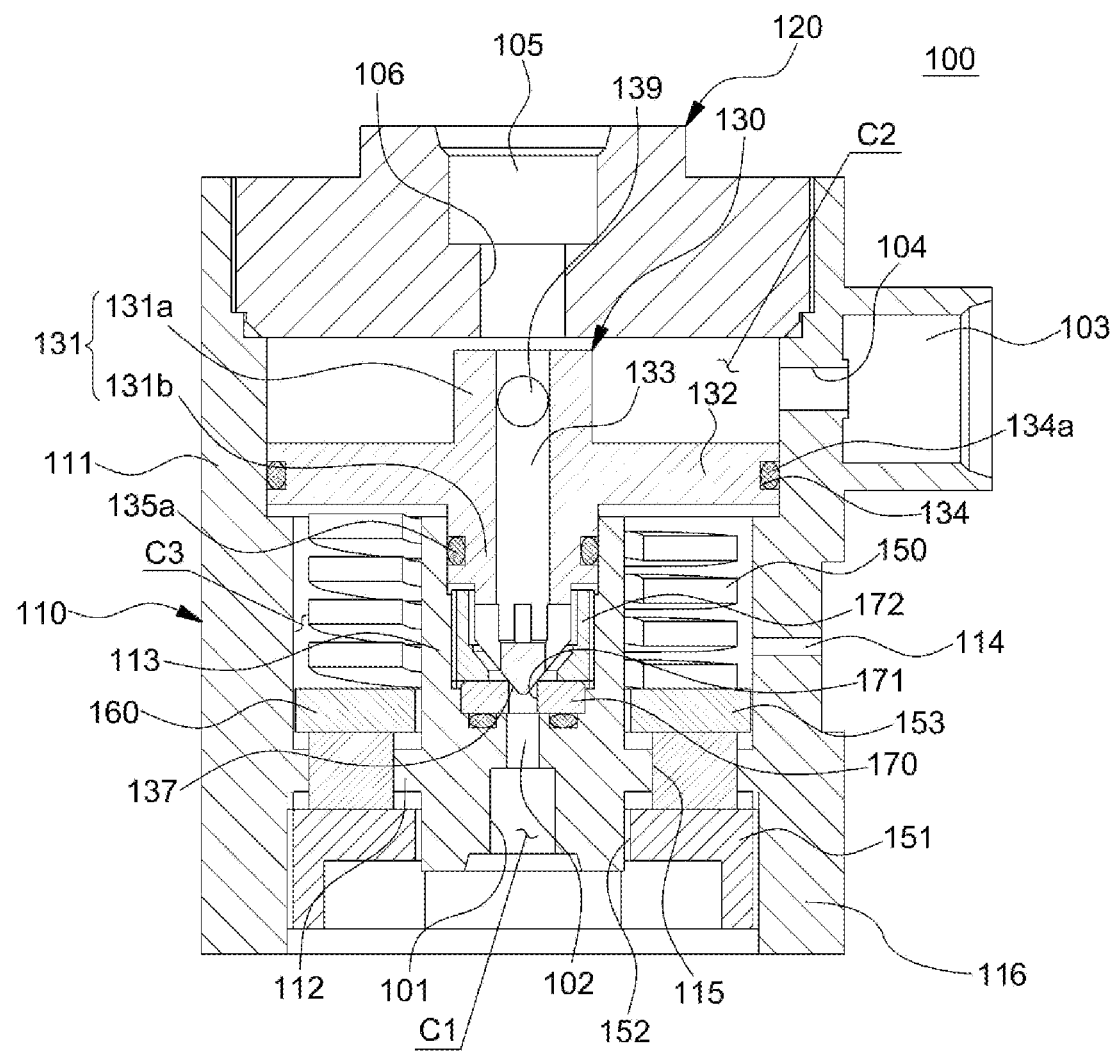
FIG. 5 is a cross-sectional view showing a pressure regulator in another form of the present disclosure.

FIG. 5 is a cross-sectional view showing a pressure regulator in another form of the present disclosure.

As illustrated in FIGS. 1 to 3, the spring 150 and the spring seat 153 are disposed outside the housing 110 and the pillars 160 penetrating through the housing 110 are supported on the spring seat 153 supported by the spring 150 and the pillars 160 are coupled to the piston 130 to transmit a force to the piston 130 inside the housing 110.

Unlike this configuration, FIG. 5 illustrates that the spring 150 and the spring seat 153 are disposed inside the housing 110 together with the piston 130, and the plurality of pillars 160 are provided to penetrate through the bottom surface of the inner space of the housing 110.

At this time, each pillar 160 is inserted into the through holes 115 formed at the installation positions of each pillar 160 on the bottom part 112 of the first cylinder portion 111.

In addition, the fact that the housing 110 has the upper first cylinder portion 111 having a relatively larger inner diameter and outer diameter and the lower second cylinder portion 111 having an inner diameter and an outer diameter relatively smaller than that of the first cylinder portion 111, and the fact that the inner space of the first cylinder portion 111 and the inner space of the second cylinder portion 113 form one inner space in the housing 110 while communicating with each other have no difference compared to the forms of FIGS. 1 to 3.

However, unlike the forms of FIGS. 1 to 3 in which the second cylinder portion 113 is positioned under the first cylinder portion 111, the rest portions of the second cylinder portion 113 other than the inlet port 101 and the like is positioned inside the first cylinder portion 111 and is integrally formed with the first cylinder portion 111 so as to have a concentric and coaxial structure.

Therefore, the spring 150 and the spring seat 153 are positioned in the space between the second cylinder portion 113 and the first cylinder portion 111. At this time, the spring 150 and the spring seat 153 are disposed around the outside of the second cylinder portion 113 from the first cylinder portion 113.

In addition, the upper end of the spring 150 is in contact with the pressure acting portion 132 of the piston 130 so that the spring 150 supports the upper piston 130 on the lower side thereof, and the pillars 160 are positioned on the lower side of the spring 150 in the state in which the spring seat 153 is interposed, such that the spring 150 is supported by the pillars 160 positioned on the lower side thereof via the spring seat 153.

In addition, the pillars 160 are in direct contact with and supported on the support member 151 screwed to the outer circumferential surface of the lower end of the second cylinder portion 113.

That is, the nut-shaped support member 151 is supported in the state in which the pillars 160 are seated on the upper surface of the support member 151 while the support member 151 is screwed to the outer circumferential surface of the lower end of the second cylinder portion 113, and the pillars 160 are connected to the spring seat 153 and the spring 150 in the force transmitting state while penetrating through the bottom part 112 of the first cylinder portion 111.

In addition, the first cylinder portion 111 is formed with a cover part 116 which extends downward from the side part and having the opened bottom part, and the support member 151, the inlet port 101 of the second cylinder portion 113 and the like are received in the inner space of the cover portion 116.

In the form of FIG. 5 as described above, the pillars 160 serve to transmit a force between the support member 151 and the spring seat 153 and the spring 150, and thus except for the initial assembling process, the moving of the pillars 160 may be reduced.

Therefore, the assembling performance of the pillars 160 can be improved, and in the form of FIG. 5, the cover portion 116 is integrally formed with the housing 110. As in the form of FIGS. 1 to 3, the cover 140 separately assembled with the housing 110 may be deleted, such that the number of components and the assembling processes can be reduced.

In addition, there is no friction between the pillars 160 and the housing 110 because there is no movement of the pillars 160 during the operation, and therefore, there is an advantage that separate lubrication is unnecessary.

The operation state of the pressure regulator according to the form of FIG. 5 is not different from that of the form of FIGS. 1 to 3 and the operation state of the pressure regulator has been described in detail above. Therefore, to avoid the duplication description, the description of the operation state of the pressure regulator according to the form of FIG. 5 will be omitted.

Hereinabove, although the forms of the present disclosure are described above in detail, the protection scope of the present disclosure is not limited thereto. Therefore, various changes and improved forms by those skilled in the art using basic concepts of the present disclosure defined in the following claims belongs to the protection scope of the present disclosure.

What is claimed is:
1. A pressure regulator for a fuel cell system, comprising:
  a housing including:
    an inlet port into which gas is introduced,
    an outlet port through which the gas is discharged,
    a first cylinder portion having an regulated pressure chamber connected to an outside through the outlet port, and
    a second cylinder portion having an inner diameter relatively smaller than an inner diameter of the first cylinder portion and provided with the inlet port;
  a piston moving up and down in the housing, and including:
    a main flow path penetrating through an inside of the housing,
    a pressure acting portion applying a pressure of gas in the regulated pressure chamber of the housing, and selectively communicating between the inlet port and the regulated pressure chamber of the housing through the main flow path as the piston moves up and down, and
    a shaft portion;

a spring provided in the housing and configured to elastically support the pressure acting portion of the piston on an opposite side of the regulated pressure chamber;

a support member screwed to an outer circumferential surface of the second cylinder portion;

pillars provided to be supported on the support member; and a spring seat interposed between the pillars and the spring, wherein:

the main flow path penetrates through an inside of the shaft portion, the shaft portion is integrally formed with the pressure acting portion having a disk shape radially extending from the shaft portion, a circumferential surface of the pressure acting portion slides along an inner circumferential surface of the first cylinder portion as the piston moves up and down in a state in which the pressure acting portion of the piston is positioned in the first cylinder portion, and the shaft portion of the piston slides along an inner circumferential surface of the second cylinder portion as the piston moves up and down.

2. The pressure regulator of claim 1, wherein the spring is positioned around the second cylinder portion, the spring seat is positioned around the second cylinder portion, and the pillars are provided to support the spring by penetrating through the first cylinder portion and when the spring seat is interposed between the support member and the pillars, and wherein a bottom part of the first cylinder portion is provided with a plurality of through holes positioned at equal intervals along a circumferential direction with respect to the second cylinder portion, and each pillar of the inserted pillars is respectively positioned between the inserted support members and the spring seat in a state in which each pillar is respectively inserted into a corresponding through hole.

* * * * *